United States Patent [19]
Fishman

[11] 3,826,305
[45] July 30, 1974

[54] TEMPERATURE CONTROLLER FOR CONTROLLING BOTH HEATING AND COOLING

[75] Inventor: Walter Fishman, Hatfield, Pa.
[73] Assignee: Leeds & Northrup Company, North Wales, Pa.
[22] Filed: Jan. 10, 1973
[21] Appl. No.: 322,325

[52] U.S. Cl. .................................. 165/26, 165/30
[51] Int. Cl. ............................................. F25b 29/00
[58] Field of Search ................................ 165/26, 30

[56] References Cited
UNITED STATES PATENTS

| | | | |
|---|---|---|---|
| 3,241,603 | 3/1966 | Nagata | 165/29 |
| 3,329,202 | 7/1967 | Birman | 165/26 |
| 3,353,589 | 11/1967 | Tope | 165/27 |
| 3,386,498 | 6/1968 | Funfstuck | 165/26 |
| 3,415,310 | 6/1967 | Kuhlmann | 165/30 |
| 3,612,165 | 10/1971 | Haynes | 165/26 |
| 3,676,937 | 7/1972 | Janson | 165/30 |
| 3,693,067 | 9/1972 | Walsh | 318/609 |

Primary Examiner—Manuel A. Antonakas
Assistant Examiner—Daniel J. O'Connor
Attorney, Agent, or Firm—William G. Miller, Jr.; Raymond F. MacKay

[57] ABSTRACT

A temperature controller for maintaining the temperature of a process at a set point by controlling the heating input in accordance with both a proportional and reset response from the temperature deviation. When the deviation indicates that the temperature control requires a cooling input to the process, a gating signal is produced. Another gating signal is produced when the manipulated variable providing the heating input is below a preset value. Gating means are provided which will respond to the coincidence of the two gating signals for introducing the cooling to the process. The cooling is thus controlled in an on-off mode.

7 Claims, 1 Drawing Figure

PATENTED JUL 30 1974
3,826,305
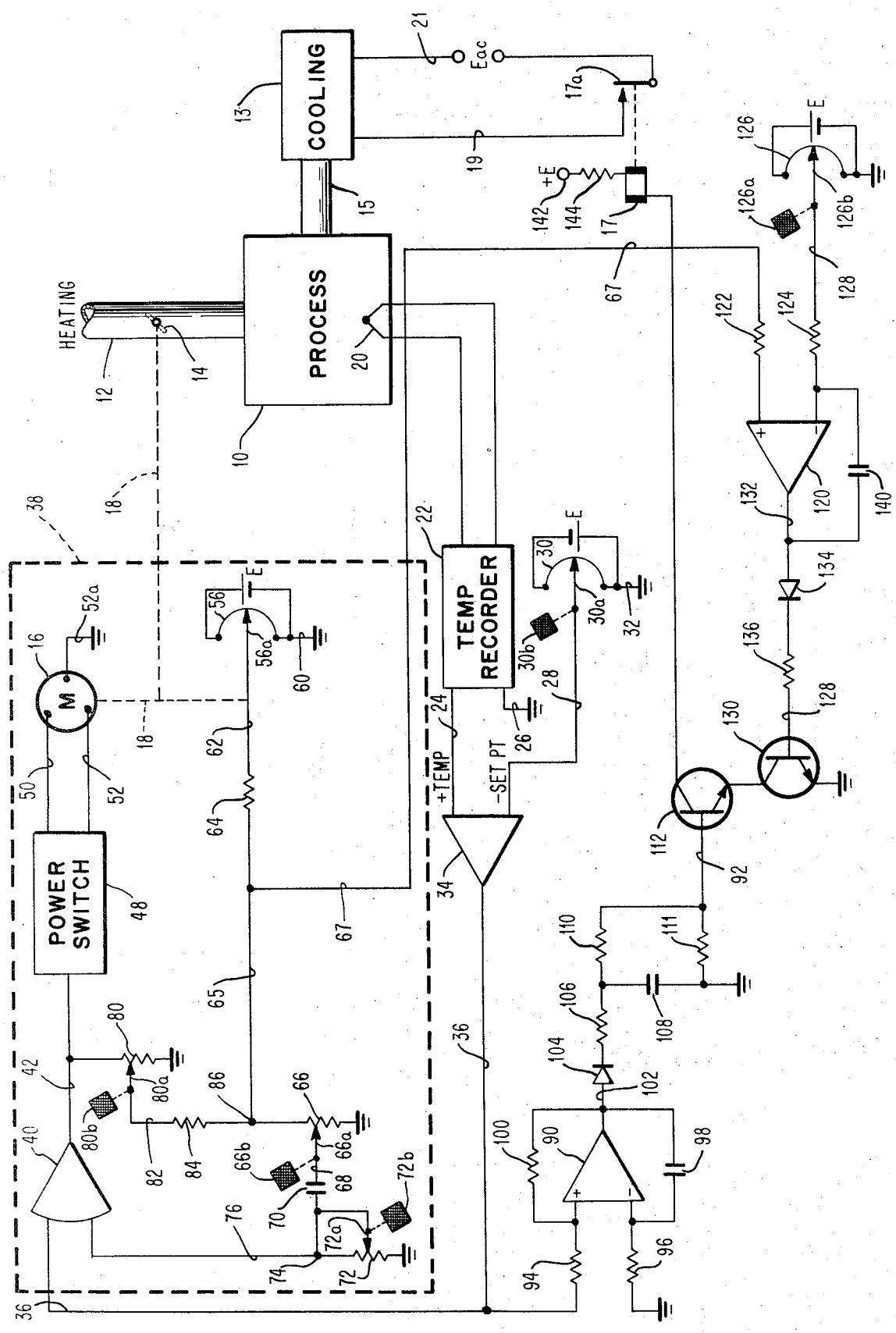

3,826,305

TEMPERATURE CONTROLLER FOR CONTROLLING BOTH HEATING AND COOLING

BACKGROUND OF THE INVENTION

This invention relates to temperature controllers for use in processes where the control is to be effected by means of both heating and cooling.

As an example, such a process may involve a plastics processing machine which is normally required to operate at a temperature above ambient, but which involves an exothermic reaction or the introduction of masses of hot material so as to require cooling to counteract the resulting upset. Other processes which may require such a dual control action includes environmental chambers and other processes where it is required to stabilize the temperature near the ambient temperature.

The prior art systems have utilized in some instances two temperature set points with the lower being used to control heating and the upper set point being used to control cooling. In other applications, the cooling set point is lower than the heating set point. The control is in some cases such that the heating and cooling overlap so that both heating and cooling are carried on at the same time and also in some applications there is a dead zone between the application of the heating and cooling so that those inputs would not be simultaneously applied.

SUMMARY OF THE INVENTION

In carrying out this invention there is provided a temperature controller for controlling both heating and cooling inputs so as to maintain a measured temperature in a process at its set point value. The combination comprises, first, a means which is responsive to a deviation between the measured temperature and the set point to produce an output from the controller that will modify the magnitude of one of the inputs to return the temperature to its set point; and secondly, a means responsive to a magnitude for the one input below a preset value and occurring coincident with a deviation value requiring an increase in the other input so as to reduce the deviation.

BRIEF DESCRIPTION OF THE DRAWING

The single FIGURE is a circuit diagram of a preferred form of the invention.

DESCRIPTION OF THE PREFERRED EMBODIMENT

In the FIGURE there is shown in block 38 a process controller which is the subject of U.S. Pat. No. 3,693,067, issued on Sept. 19, 1972, to Thomas J. Walsh, a coworker of mine. That process controller provides both proportional and reset responses to the deviation signal appearing on line 36 as an input thereto. As shown in the FIGURE, the heating input through the pipe 12, which carries fuel to the process 10, is controlled by butterfly valve 14 through the operation of the mechanical coupling 18 which is the output of the controller 38. Thus, the manipulated variable controlled by the mechanical coupling 18 may, for example, be the flow of heating oil in pipe 12 to a burner in the process 10 for a control of the heating of the process.

For the purposes of this description, it will be assumed that the process 10 is an application which normally requires heating although it may, upon occasion, due to the exothermic nature of the process or the addition of hot material, require the application of a cooling input. The cooling input is provided from a cooling unit 13 which is constructed so as to supply a cooling input through pipe 15 to the process 10. Upon the closure of contact 17a by the energization of the contact operator 17, for example, the source of potential $E_{ac}$ will cause a current flow through the wires 19 and 21 to a compressor in the cooling unit 13 so as to start up that compressor to provide the necessary flow of refrigerant in the unit 13. The compressor will be disconnected upon opening of the contact 17a when the contact operator 17 is de-energized.

While the detailed operation of the controller shown in block 38 is explained more fully in the above mentioned U.S. patent, it will be helpful for the purposes of this description to point out the following factors regarding controller 38. The high gain amplifier 40 receives as one input thereto, a deviation signal on line 36. That signal represents the deviation from set point of the temperature measured by thermocouple 20 in the process 10. The set point value is established by the setting of the contact 30a by the adjustment of knob 30b on the potentiometer slidewire 30. Thus, operational amplifier 34 produces the deviation signal on line 36 by comparing the potential representing the set point, as it appears on line 28, with that representing the temperature, as it appears on line 24 from temperature recorder 22.

In the process controller 38 the output of the amplifier 40 on line 42 is supplied to a power switch shown as block 48. The power switch provides on its output lines 50 and 52 the necessary power to cause motor 16 to rotate in either a forward or reverse direction, depending on the polarity of the signal on line 42. The mechanical coupling 18 from the motor 16 operates the slidewire contact 56a of slidewire 56 so as to provide on line 62 a signal in the form of a feedback potential indicative of the state of the control element 14 and hence the magnitude of the manipulated variable controlled thereby.

The signal on line 62 is introduced into a network including fixed resistor 64 and a signal divider in the form of potentiometer 66 which is so arranged so that a manually adjusted tap 66a will provide on line 68 a signal in the form of a potential which is a predetermined portion of the potential on line 62. Thus, the adjustment of the tap 66a determines the proportional response of the controller.

In order to provide a reset response for controller 38, the line 68 is connected to a serially connected combination of capacitor 70 and variable resistor 72 which establishes the reset rate of the controller 38. There is then connected by way of line 76 a feedback signal for the amplifier 40. Characteristically, the feedback signal on line 76 is of polarity such that it will oppose the signal on line 36 so as to tend to reduce the output of amplifier 40.

In the controller 38 the gain of the amplifier 40 is determined by the connection of adjustable potentiometer 80 in the feedback path of the amplifier. The output of the adjustable potentiometer 80, as obtained at the adjustable tap 80a, is connected by way of the fixed resistor 84 to the junction 86 so that a potential related to the potential on line 42 provides a second feedback signal which is proportional to the control signal on line 42. There is thus provided means for establishing the effective gain of amplifier 40 by adjustment of the knob 80b so that the adjustment of knob 66b will not effect the sensitivity of the controller as is the case with other controller configurations.

A differential amplifier 90 is utilized to provide a first gating signal on line 92. The amplifier 90 receives as an input at its non-inverting input terminal, a signal from line 36 by way of the input resistor 94. The inverting input of the amplifier 90 is connected by way of resistor 96 to ground and there is provided from the output of amplifier 90 a connection to the inverting input through a capacitor 98. The connection between the output of the amplifier 90 and the noninverting input is by way of fixed resistor 100. The resistor 100 serves as a positive feedback resistor to provide a deadband between the turn-on and turn-off for amplifier 90. The capacitor 98 provides a means for suppressing noise by providing an AC negative feedback path. There is thus, produced on line 102 a positive signal when the deviation signal on line 36 is positive.

The positive signal on line 102 will be conducted through diode 104 and the serially connected resistor 106 so as to charge capacitor 108. The capacitor 108 then supplies by way of the fixed resistor 110 the first gating signal to the base of transistor 112 which will cause the transistor to be conductive so that current may flow between the collector and emitter. Thus, when the temperature measured by thermocouple 20 is above the set point as established by the adjustment of knob 30b, the signal on line 36 is such to cause the transistor 112 to be conductive. Resistor 111 provides a discharge path for capacitor 108 to insure quick turn-off of transistor 112.

The differential amplifier 120 has the input to its non-inverting terminal supplied from line 65 by way of line 67 and the input resistor 122.

The amplifier 120 also has supplied to its inverting input by way of resistor 124 a potential established by adjustment of knob 126a which adjusts the contact 126b of potentiometer 126 so as to provide on the input line 128 a potential which is a fraction of the potential E which is supplied across potentiometer 126 and which represents a certain predetermined magnitude of the manipulated variable flowing in pipe 12. That magnitude may, for example, be 20 percent of the full range. When the manipulated variable is below that value it is desired that there appear a second gating signal on line 128 of polarity to make transistor 130 conductive. To this end there is provided in the output line 132 of amplifier 120 a diode 134 poled to conduct positive signals on line 132 through resistor 136 to the base of transistor 130 by way of line 128.

The capacitor 140 serves the same purpose as capacitor 98, namely, the provision of an AC coupling from the output of amplifier 90 to the inverting input so as to reduce noise.

From the above description of the circuit of the FIGURE it will be evident that the potential E applied at terminal 142 will cause a current to flow through resistor 144 and contact energizer 17 when transistor 112 and transistor 130 are both conductive as when the first gating signal on line 92 and the second gating signal on line 128 are present at the same time.

From the above description it will be evident that the process 10 is controlled by a proportional and reset controller 38 to modify the heating input to the process during the normal course of the process and that upon the occasion of an upset in the process as might be caused, for example, by an exothermic reaction or by an introduction of hot material thereto, the controller 38 may be unable to maintain the temperature at the desired set point so as to cause a deviation to appear on line 36 indicating that the temperature is above set point. At the same time that the deviation on line 36 indicates a temperature above the set point, the manipulated variable, such as the heating oil flow through pipe 12, may have decreased markedly below that normally required for the process to a value below that preset by knob 126a. When that situation arises, the controller will operate to turn on the cooling input to the process by creating a coincident of the occurrence of the first and second gating signals causing activation of the cooling input. The cooling input will then be controlled in an on-off fashion in that the cooling will be turned off either when the temperature is no longer above the set point or when the manipulated variable is at a value above that set by knob 126a as indicated by the signal on line 67 from the controller feedback path. When the upset condition is overcome the normal proportional action of controller 38 returns the temperature to the set point with minimum overshoot.

It will be evident to those skilled in the art that in some processes cooling may constitute the normal input and heating might be only occasionally necessary. With such a process, the heating and cooling controls of the FIGURE may be interchanged. It will likewise be evident that the use of the feedback signal on line 65 to indicate the magnitude of the manipulated variable, may be replaced with other signals related to the value of the manipulated variable. For example, the manipulated variable could be measured directly.

The setting for contact 126b may be just below the value for the manipulated variable normally experienced in the process under control or it may be set at a low value. Typically, it has been found to be useful to set contact 126b at 20 percent of the full range of the feedback signal.

What is claimed is:

1. A temperature controller for a process comprising:

means to maintain a measured temperature at a set point by controlling one of a pair of process inputs having opposite effects on said temperature, means responsive to a deviation between said measured temperature and said set point to produce an output from the controller operable to modify the magnitude of one of the inputs to the procees so as to tend to return said temperature to its set point, and means responsive only to the coincident occurrence of a magnitude for said one input below a preset value and a value for said deviation such that an increase in the other of said pair of inputs reduces the deviation, said last named means being operable to effect an increase in said other input to tend to reduce said deviation.

2. A process temperature controller comprising:

means responsive to a signal representing the deviation from set point of a process temperature for producing a control signal operable to control the heat input to the process so as to tend to reduce said deviation, means responsive to said deviation signal for producing a first gating signal when said deviation indicates said temperature is higher than said set point, means for producing a second gating signal when the effect of the control signal is to decrease the magnitude of the manipulated variable below a preset value, and gating means responsive to the coincidence of said first and second gating signals for introducing a cooling input to said process as long as said first and second gating signals are produced.

3. A process temperature controller as set forth in claim 2 in which the gating means includes a first and second switching element responsive to said first and second gating signals, respectively, and in which said switching elements upon actuation by said signals complete a series circuit for carrying a current which is effective to initiate the introduction of cooling to said process so that said cooling is continued until one of said gating signals disappears.

4. A process temperature controller as set forth in claim 2 in which said means for producing the control signal includes proportional and reset response to the deviation.

5. A process temperature controller comprising:

means responsive to a signal representing the deviation from set point of a process temperature for producing a control signal operable to control the heat input to the process so as to tend to reduce said deviation, means responsive to said deviation signal for producing a first gating signal when said deviation indicates said temperature is higher than said set point, means for producing a second gating signal when the effect of the control signal is to decrease the magnitude of the manipulated variable below a preset value, and gating means responsive to the coincidence of said first and second gating signals for modifying a cooling input to said process so as to tend to reduce said deviation.

6. A process temperature controller comprising:

control means responsive to both a signal representing the deviation from set point of a process temperature and a feedback signal representing the magnitude of the manipulated variable of the process for producing a control signal operable to control the heat input to the process so as to tend to reduce said deviation, means responsive to said deviation signal for producing a first gating signal when said deviation indicates said temperature is higher than said set point, means for producing from said feedback signal a second gating signal when the feedback signal is of value to represent a magnitude of the manipulated variable below a preset value, and gating means responsive to the coincidence of said first and second gating signals for introducing a cooling input to said process as long as said first and second gating signals are produced.

7. A temperature control system for a process comprising:

a heating input to the process, a cooling input to the process, means for measuring that temperature in the process which is to be controlled, means for establishing a set point value for said temperature, means responsive to the difference between the said measured temperature and said set point to produce a control output operable to modify the magnitude of one of the inputs to the process so as to tend to return said temperature to its set point, and means responsive only to the coincident occurrence of a magnitude for said one input which is below a preset value and a value for said difference such that an increase in said other input would be effective to reduce said difference, said last named means being operable to effect a change in said other input to tend to reduce said deviation.

* * * * *